US005655437A

United States Patent [19]
Vitacca

[11] Patent Number: 5,655,437
[45] Date of Patent: Aug. 12, 1997

[54] FLAMELESS CHARCOAL SIDE BURNER SYSTEM

[76] Inventor: Leonard J. Vitacca, 7104 W. 114th St., Worth, Ill. 60482

[21] Appl. No.: 634,583

[22] Filed: Apr. 18, 1996

[51] Int. Cl.$^6$ .................................................. A47J 37/08
[52] U.S. Cl. .................. 99/400; 99/421 H; 99/385; 126/25 R
[58] Field of Search .................. 99/385, 393, 395, 99/400, 401, 419, 421 H, 421 HH; 126/25 R, 9 R, 25 AA

[56] References Cited

U.S. PATENT DOCUMENTS

| 2,885,950 | 5/1959 | Stoll et al. | 99/421 H |
|---|---|---|---|
| 3,175,549 | 3/1965 | Bergsten | 126/25 R |
| 3,182,585 | 5/1965 | Rensch et al. | 99/393 X |
| 3,363,543 | 1/1968 | Roberts et al. | 99/393 X |
| 3,783,855 | 1/1974 | Newinger | 126/25 R |
| 3,832,989 | 9/1974 | Belford | 126/25 R |
| 4,619,190 | 10/1986 | Smith | 99/393 |

Primary Examiner—Reginald Alexander

[57] ABSTRACT

A new Flameless Charcoal Side Burner System for providing a charcoal grill allowing a user to prepare food with an adjustable continuous charcoal heating source without flames singing the food or flaring toward the user. The inventive device includes a side burner structure for retaining charcoal, a lower grill structure, and an upper grill structure supporting the side burner structure.

2 Claims, 3 Drawing Sheets

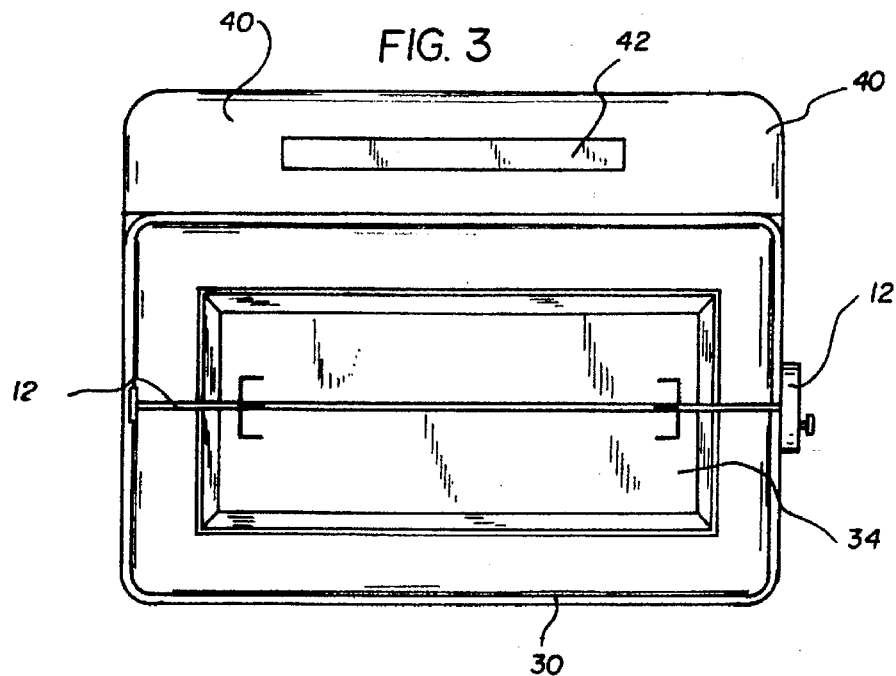
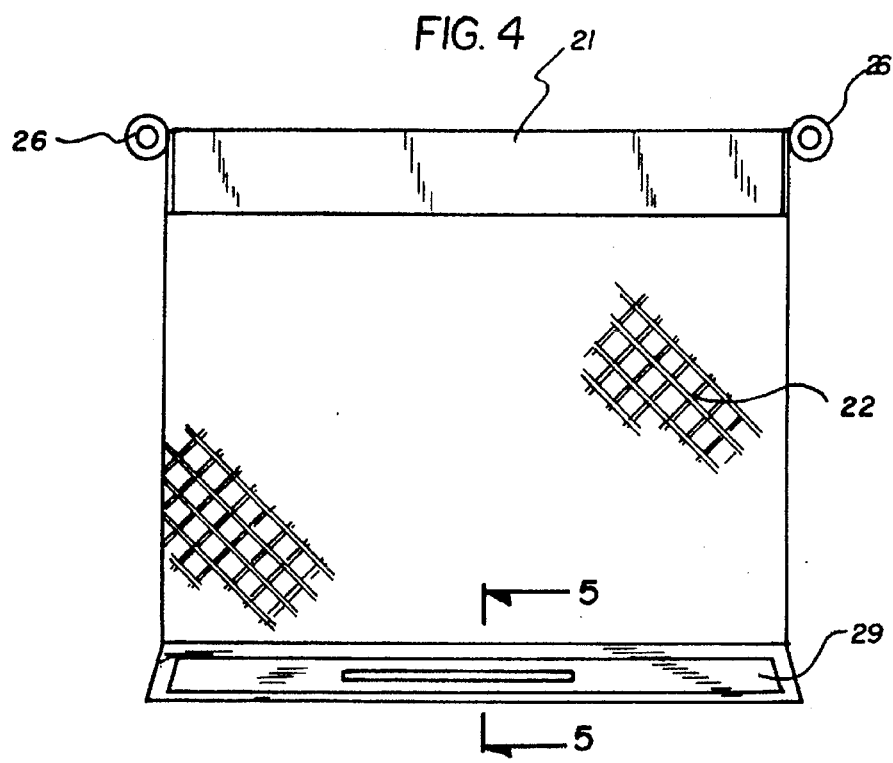

FLAMELESS CHARCOAL SIDE BURNER SYSTEM

BACKGROUND OF THE INVENTION

1. Field of the Invention

The present invention relates to Barbecue Devices and more particularly pertains to a new Flameless Charcoal Side Burner System for providing a charcoal grill allowing a user to prepare food with an adjustable continuous charcoal heating source without flames singing the food or flaring toward the user.

2. Description of the Prior Art

The use of Barbecue Devices is known in the prior art. More specifically, Barbecue Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Barbecue Devices include U.S. Pat. No. 4,072,092; U.S. Pat. No. 4,089,258; U.S. Pat. No. Des. 253,804; U.S. Pat. No. 5,431,093; U.S. Pat. No. 4,850,333 and U.S. Pat. No. 4,627,410.

While these devices fulfill their respective, particular objectives and requirements, the aforementioned patents do not disclose a new Flameless Charcoal Flameless Charcoal Side Burner System System. The inventive device includes a side burner structure for retaining charcoal, a lower grill structure, and an upper grill structure supporting the side burner structure.

In these respects, the Flameless Charcoal Side Burner System according to the present invention substantially departs from the conventional concepts and designs of the prior art, and in so doing provides an apparatus primarily developed for the purpose of providing a charcoal grill allowing a user to prepare food with an adjustable continuous charcoal heating source without flames singing the food or flaring toward the user.

SUMMARY OF THE INVENTION

In view of the foregoing disadvantages inherent in the known types of Barbecue Devices now present in the prior art, the present invention provides a new Flameless Charcoal Side Burner System construction wherein the same can be utilized for providing a charcoal grill allowing a user to prepare food with an adjustable continuous charcoal heating source without flames singing the food or flaring toward the user. The general purpose of the present invention, which will be described subsequently in greater detail, is to provide a new Flameless Charcoal Side Burner System apparatus and method which has many of the advantages of the Barbecue Devices mentioned heretofore and many novel features that result in a new Flameless Charcoal Side Burner System which is not anticipated, rendered obvious, suggested, or even implied by any of the prior art Barbecue Devices, either alone or in any combination thereof.

To attain this, the present invention generally comprises a side burner structure for retaining charcoal, a lower grill structure, and an upper grill structure supporting the side burner structure.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Flameless Charcoal Side Burner System apparatus and method which has many of the advantages of the Barbecue Devices mentioned heretofore and many novel features that result in a new Flameless Charcoal Side Burner System which is not anticipated, rendered obvious, suggested, or even implied by any of the prior art Barbecue Devices, either alone or in any combination thereof.

It is another object of the present invention to provide a new Flameless Charcoal Side Burner System which may be easily and efficiently manufactured and marketed.

It is a further object of the present invention to provide a new Flameless Charcoal Side Burner System which is of a durable and reliable construction.

An even further object of the present invention is to provide a new Flameless Charcoal Side Burner System which is susceptible of a low cost of manufacture with regard to both materials and labor, and which accordingly is then susceptible of low prices of sale to the consuming public, thereby making such Flameless Charcoal Side Burner System economically available to the buying public.

Still yet another object of the present invention is to provide a new Flameless Charcoal Side Burner System which provides in the apparatuses and methods of the prior art some of the advantages thereof, while simultaneously overcoming some of the disadvantages normally associated therewith.

Still another object of the present invention is to provide a new Flameless Charcoal Side Burner System for providing a charcoal grill allowing a user to prepare food with an adjustable continuous charcoal heating source without flames singing the food or flaring toward the user.

Yet another object of the present invention is to provide a new Flameless Charcoal Side Burner System which includes a side burner structure for retaining charcoal, a lower grill structure, and an upper grill structure supporting the side burner structure.

Even still another object of the present invention is to provide a new Flameless Charcoal Side Burner System wherein the user is able to prepare food with an adjustable continuos charcoal heating source without flare-ups singing the food.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top view of the present invention.

FIG. 4 is a rear elevation view of the invention.

DESCRIPTION OF THE PREFERRED EMBODIMENT

Figure 1:
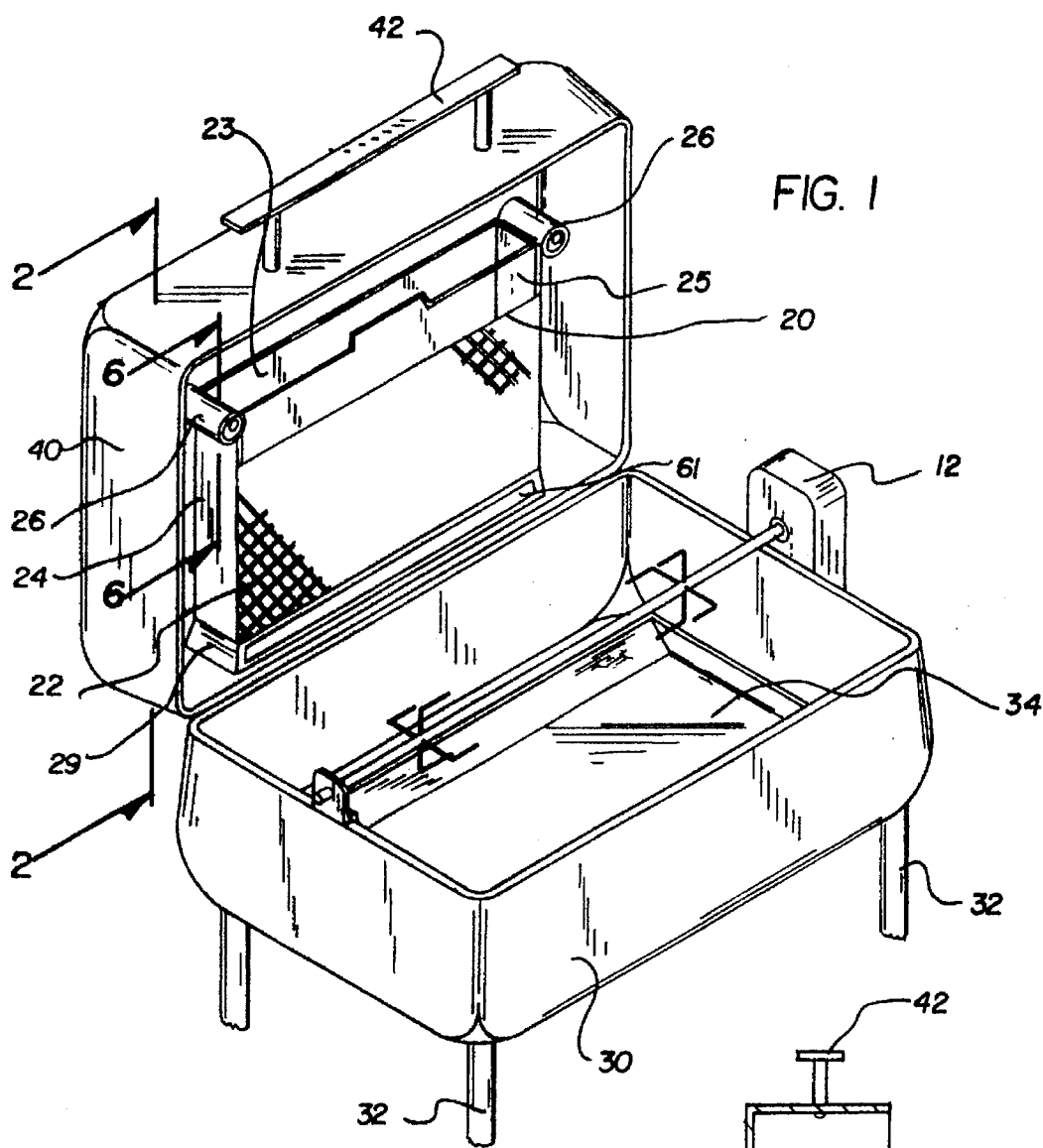
FIG. 1 is an upper front perspective view of a new Flameless Charcoal Side Burner System according to the present invention.
Figure 2:
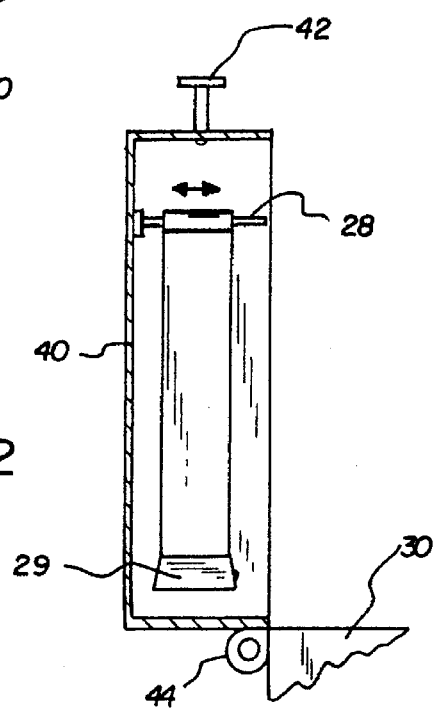
FIG. 2 is a cross sectional view taken along line 2—2 of FIG. 1.
Figure 5:
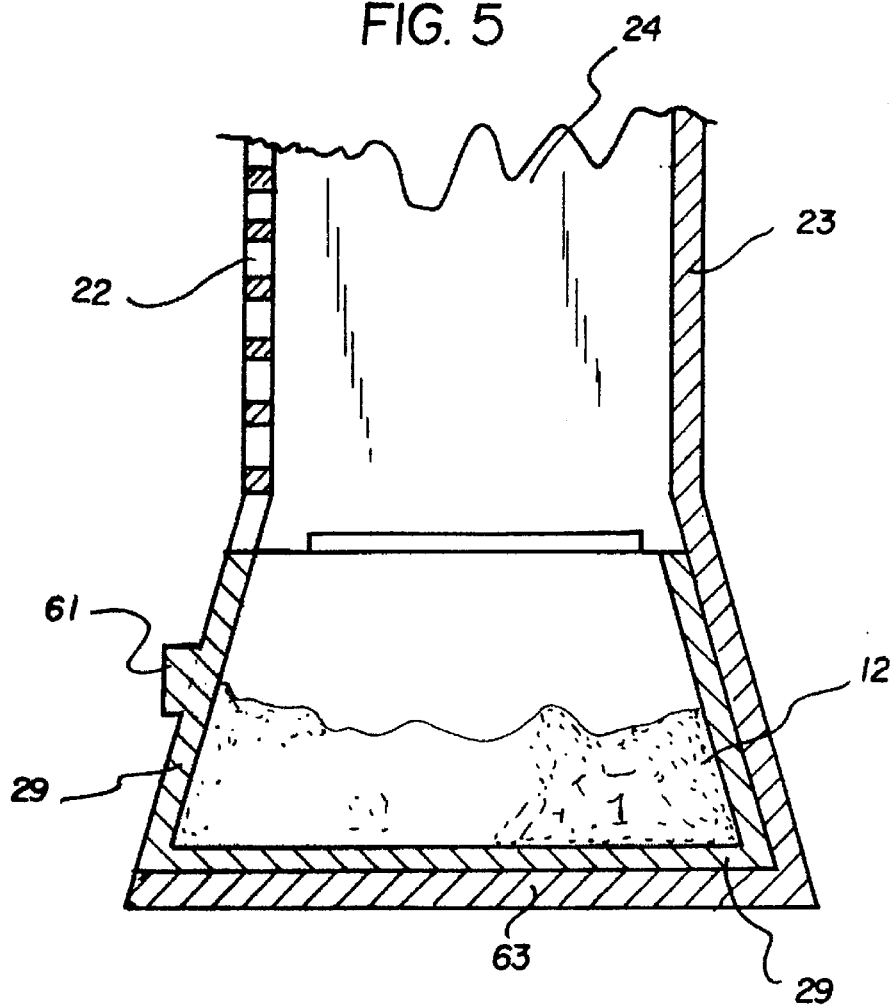
FIG. 5 is a cross sectional view taken along line 5—5 of FIG. 4.
Figure 6:
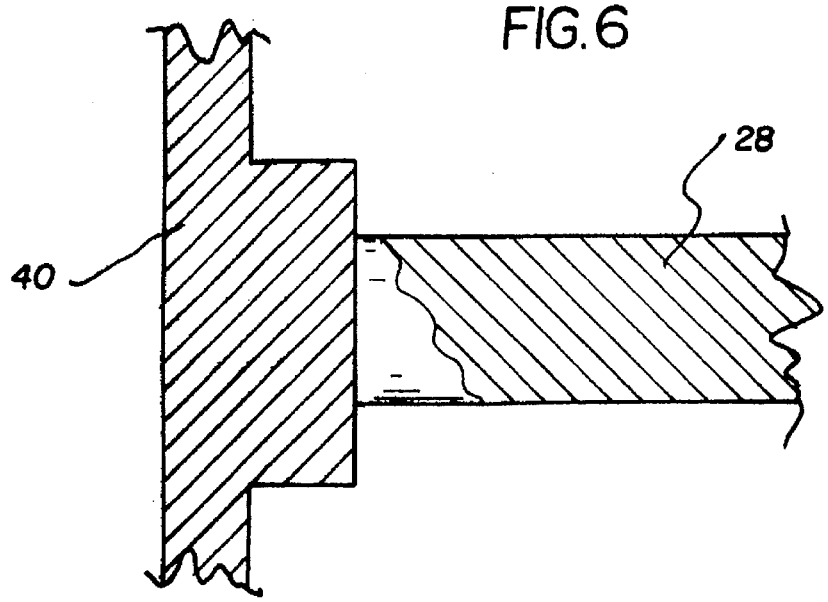
FIG. 6 is a cross sectional view taken along line 6—6 of FIG. 1.

With reference now to the drawings, and in particular to FIGS. 1 through 6 thereof, a new Flameless Charcoal Side Burner System embodying the principles and concepts of the present invention and generally designated by the reference numeral 10 will be described.

More specifically, it will be noted that the Flameless Charcoal Side Burner System 10 comprises an upper grill structure 40, a side burner structure 20 slidably secured to the upper grill structure 40, and a lower grill structure 30 pivotally supporting the upper grill structure 40.

As best illustrated in FIGS. 1 through 6, it can be shown that an upper grill handle 42 is secured to the upper portion of the upper grill structure 40. The upper grill structure 40 is pivotally secured to the lower grill structure 30 by a hinge member 44. A grease receiving pan 34 and a food supporting means 14 are included in the lower grill structure as shown in FIGS. 1 and 3.

As best shown in FIG. 1, the side burner structure 20 comprises a first side wall 24 secured to a mesh front wall 22 allowing heat from charcoals to radiate toward the food. A second side wall 25 is secured to the mesh front wall 22 opposite of the first side wall 24. One end of a rear wall member 23 is secured to the first side wall 24 and the opposite end is secured to the second side wall 25 opposite of the mesh front wall 22 creating a square shaped tube structure. An upper front support member 21 is secured to the upper portion of the mesh front wall 22 with one end attaching to the first side wall 24 and the opposite end attaching to the second side wall 25 giving support to the mesh front wall 22. At least one adjusting support tube 26 is secured to the upper portion of the side burner structure 20. At least one supporting rod member 28 is secured to the upper grill structure 40 projecting through the adjusting support tube 26 allowing adjustment of the distance between the charcoal heating source and the food being prepared. A collecting means support member 63 is secured orthogonally to the bottom end of the rear wall member 23 supporting a charcoal ash collecting means 29. A collecting means handle 61 is secured to the front of the charcoal ash collecting means 29.

In use, the user inserts charcoals into the side burner structure 20 through the top opening and ignites the charcoals. The user places food onto the food supporting means 14 adjusting the distance of the charcoals from the food by sliding the side burner structure 20. During utilization, ash 12 collects inside of the charcoal ash collecting means 29, thereafter the user may pull the charcoal ash collecting means 29 from the side burner structure 20 disposing of the ash 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A Flameless Charcoal Side Burner System comprising:
   an upper grill structure;
   a side burner structure slidably secured to the upper grill structure;
   a lower grill structure pivotally supporting the upper grill structure;
   the upper grill structure includes an upper grill handle and where the upper grill structure is pivotally secured to the lower grill structure by a hinge member;
   the lower grill structure includes a grease receiving pan and a food supporting means; and
   the side burner structure comprises:
   a first side wall;
   a mesh front wall secured to the first side wall;
   a second side wall secured to the mesh front wall opposite of the first side wall;
   a rear wall member secured to the first side wall and the second side wall opposite of the mesh front wall; and
   an upper front support member secured to the upper portion of the mesh front wall with one end attaching to the first side wall and the opposite end of the upper front support member attaching to the second side wall.

2. The Flameless Charcoal Side Burner System of claim 1, wherein the side burner structure further comprises:

at least one adjusting support tube secured to upper portion of the side burner structure;

at least one supporting rod member secured to the upper grill structure projecting through the adjusting support tube; and a collecting means support member secured orthogonally to the bottom end of the rear wall member supporting a charcoal ash collecting means with a collecting means handle secured to the front of the charcoal ash collecting means.

* * * * *